(12) United States Patent
Freeny

(10) Patent No.: US 6,195,670 B1
(45) Date of Patent: *Feb. 27, 2001

(54) SMART MODULAR ELECTRONIC MACHINE

(75) Inventor: Charles C. Freeny, Dallas, TX (US)

(73) Assignee: Automated Business Companies, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/360,078

(22) Filed: Jul. 23, 1999

Related U.S. Application Data

(63) Continuation of application No. 08/932,907, filed on Sep. 17, 1997, now Pat. No. 5,978,821.

(51) Int. Cl.[7] .......................................... G06F 1/16
(52) U.S. Cl. ........................................ 708/100; 361/683
(58) Field of Search ............................ 708/100; 361/683

(56) References Cited

U.S. PATENT DOCUMENTS

| 5,077,683 | 12/1991 | Aydin .................................... | 364/708 |
| 5,277,615 | 1/1994 | Hastings et al. ...................... | 439/377 |
| 5,337,464 | 8/1994 | Steffes ................................... | 29/401.1 |
| 5,555,158 | 9/1996 | Dent ...................................... | 361/684 |
| 5,608,608 | 3/1997 | Flint et al. ............................ | 361/686 |
| 5,708,563 | 1/1998 | Cranston, III et al. ............... | 361/683 |
| 5,726,922 | 3/1998 | Womble et al. ...................... | 364/708 |
| 5,816,725 | 10/1998 | Sherman et al. ..................... | 400/692 |

FOREIGN PATENT DOCUMENTS

| 599504A1 | 6/1994 | (EP) . |

*Primary Examiner*—David H. Malzahn
(74) *Attorney, Agent, or Firm*—Dunlap, Codding & Rogers, P.C.

(57) ABSTRACT

The present invention relates generally to an apparatus for converting an open architecture computer into both an open and a closed architecture computer. The open architecture computer includes a housing defining a housing space and a computer processor disposed in the housing space of the housing. In one embodiment the apparatus comprises a modular computer peripheral physically connectable to only one open architecture computer, and a communication means electrically connectable to the open architecture computer and the modular computer peripheral for permitting communication between the computer processor of the open architecture computer and the controller of the modular computer peripheral. The modular computer peripheral comprises a housing defining a plurality of module bays. At least one module is disposed in one of the module bays and at least one of the modules comprising a closed architecture computer which is capable of operating independently of the open architecture computer. A controller capable of simultaneously controlling a plurality of the modules is provided and interface means electrically connected to the controller and the modules when the modules are disposed in the module bays of the housing is provided for permitting electrical communication between the controller and the modules.

16 Claims, 5 Drawing Sheets

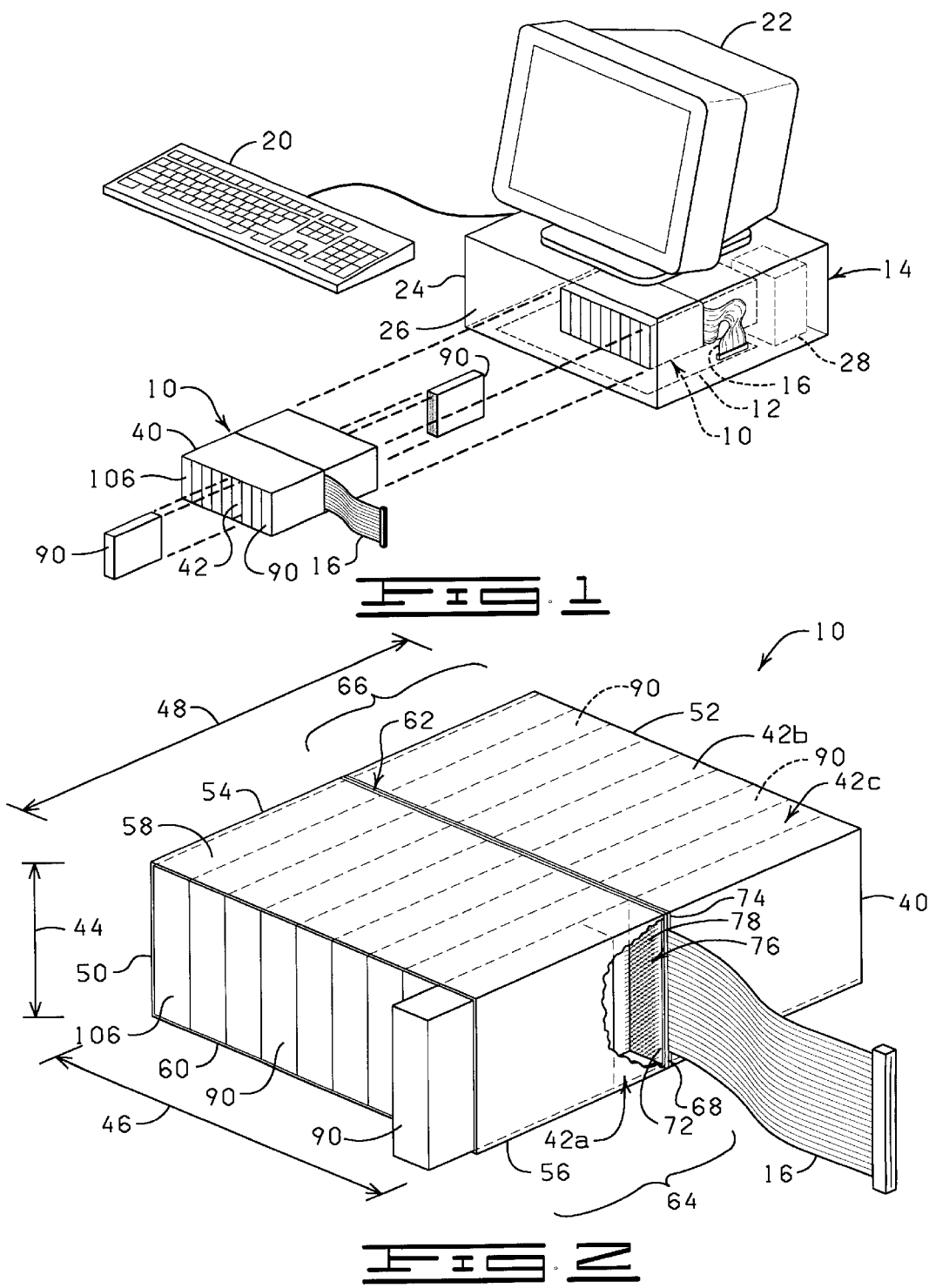

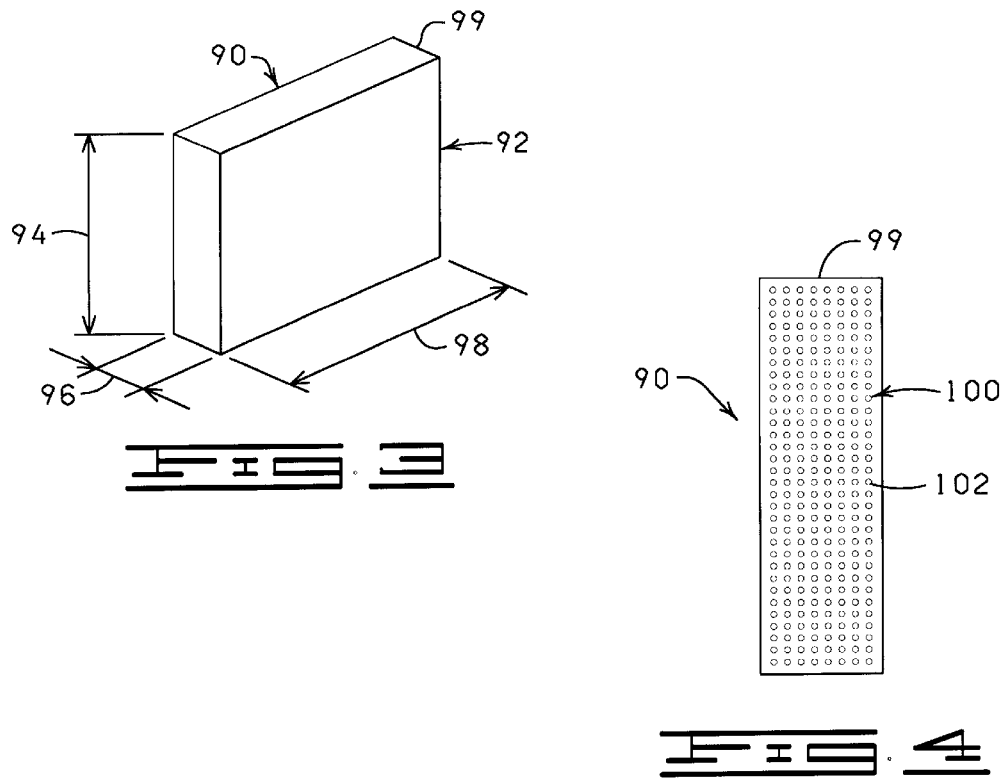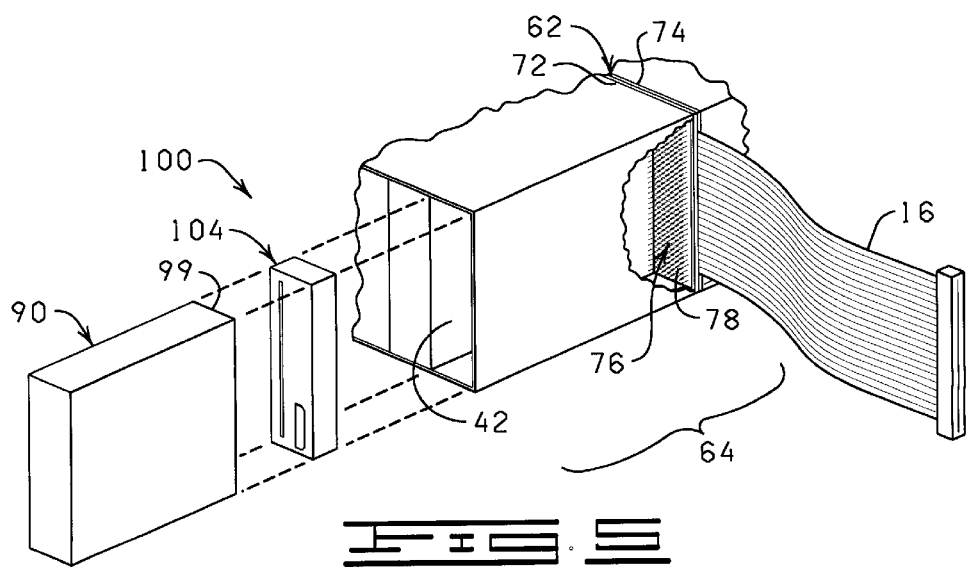

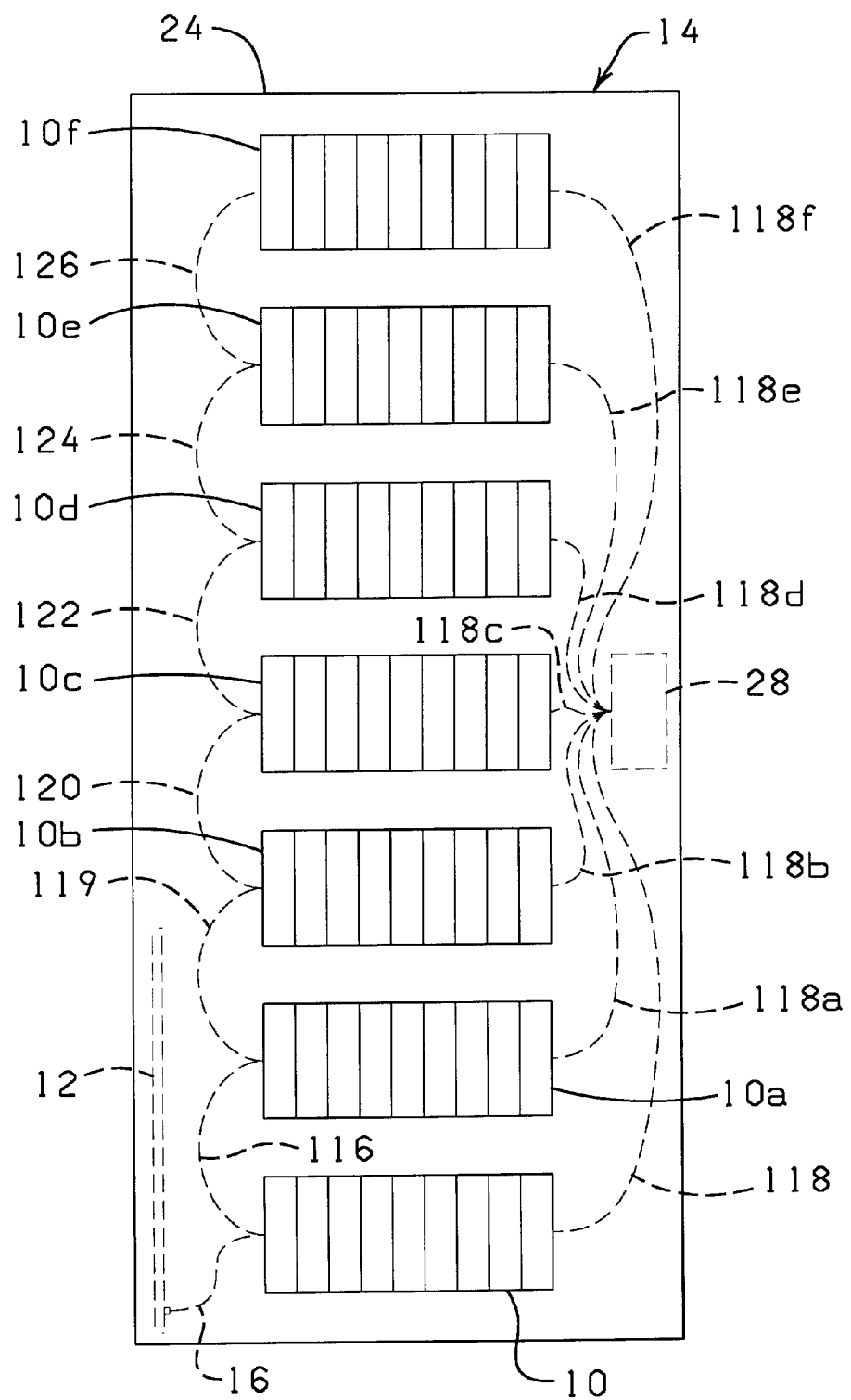

SMART MODULAR ELECTRONIC MACHINE

This is a continuation of application Ser. No. 08/932,907 filed on Sep. 17, 1997, now U.S. Pat. No. 5,978,821, the specification, claims and drawings of which are hereby incorporated herein by reference.

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates generally to methods and apparatus for enhancing the speed, efficiency and upgradeability of open architecture computers, and more particularly, but not by way of limitation, to a modular computer peripheral including a peripheral housing defining a plurality of module bays adapted to receive corresponding computer modules.

2. Brief Description of Related Art

Open architecture computers such as those commonly referred to as "personal computers" are well known in the art. There have been many attempts to improve the speed and storage performance of personal computers. The increased speed and storage performance permits personal computers to run more powerful software and store larger data files which enhances the benefit of the personal computer to an end user.

For example, computer manufacturers have incorporated faster processing CPUs such as the 286, 386, 486, and the Pentium to increase the performance of the personal computers. Improvements have also been made by the hard drive manufacturers such as Seagate, Micropolus, and Western Digital who have developed faster and smaller mechanical hard drives for personal computers. Specialized personal computer performance cards which are closed architecture systems have been developed which fit into one or more of the standardized modular spaces available in a personal computer and which improve or provide new capacity to the personal computer in such specialized areas as the video display, the CD rom, tape storage, and multimedia capability. In addition, there are hundreds of software inventions and improvements which have been developed in the last few years such as the Windows 95 operating system by Microsoft and the OS/2 operating system by IBM which improved the computer memory management in an attempt to speed up the performance of personal computer application programs.

To increase the expandability and upgradeability of personal computers, personal computer housings have been manufactured which offer multiple modular spaces to accept several large hard drive systems, tape units, CD rom drives, and several personal computer motherboards. One example of such a large personal computer housing is that offered with the NCR model 3450 personal computer unit.

Although the advancements described above have and continue to increase the performance of personal computers significantly, two inherent flaws have hindered the advances in increasing the performance of personal computers. Namely, the low bit process capability and the open architecture requirement.

The low bit processing speed has been overcome somewhat by increased central processing unit speeds (these have gone from two megahertz to 200 megahertz in about ten years). However, the major bottleneck is in the open architecture requirement of the personal computer system in that the whole hardware industry has to adhere to the previous standards for any improvements in the personal computer because all of the existing software must operate on the new machine. Thus, even the powerful Pentium 32 bit 200+ megahertz central processing unit cannot increase the speed of some computer systems because both the hardware and the software cannot take advantage of these new advances because of the open architecture requirement of the personal computer system.

Because manufacturers of closed architecture computers, such as IBM 400 series mainframe computers are not bound by the open architecture requirements of the personal computer, the closed architecture computer manufacturers can typically build more powerful computers than the standard personal computers while using substantially the same central processing unit technology. It would represent an advance in the state of the art of computer systems if one were to build an open architecture computer which maintained the compatibility of the existing software and hardware of the open Architecture PC computer but which utilized the speed of a closed architecture computer such as one or several specialized digital signal processors (DSP's) programmed to permit the existing software to be operated more quickly. It is to such an improved computer system that the present invention is directed.

BRIEF SUMMARY OF THE INVENTION

The present invention generally relates to a modular computer peripheral for use with an open architecture computer including a housing defining a predetermined peripheral space within the housing. Specifically, the modular computer peripheral includes a peripheral housing sized to be disposed within the predetermined peripheral space within the open architecture computer such that the peripheral housing is mechanically connectable to only one open architecture computer. The peripheral housing defines a plurality of module bays adapted to receive respective computer modules. One of the modules can be a control module adapted to simultaneously control a plurality of the other modules when the other modules are disposed in the module bays of the peripheral housing. A common computer bus separate from the computer bus on the motherboard of the open architecture computer is disposed within the peripheral housing for permitting electrical communication between each of the module bays. The modular computer peripheral is further provided with a connector assembly such as a connector cable for electrically connecting the modular computer peripheral to the computer bus of the motherboard of the open architecture computer.

To overcome the low bit processing speed of the open architecture computer, the common computer bus of the modular computer peripheral is at least twice as wide as the computer bus of the open architecture computer and is typically about 256 bits wide. The problems associated with the open architecture requirement of the personal computer system has been overcome by the modular computer peripheral by the connector assembly and the control module of the modular computer peripheral. The connector assembly permits two way communication between the modular computer peripheral and the open architecture computer so that open architecture application program commands and data and can be transmitted and received by the modular computer peripheral. The control module is provided with a control module computer which does not have to meet the open architecture requirements to function correctly. In other words, the control module computer can be a closed architecture computer so that the control module computer can be designed to take advantage of new advances in both hardware and software technology without having to adhere to the previous standards. Thus, the modular computer peripheral represents an advance in the state of the art of computer systems in that the compatibility of the existing software and hardware of the open architecture computer has been maintained while the modular computer peripheral utilizes the speed of a closed architecture computer to permit the application software of the open architecture computer to be operated more quickly.

Other objects, features, and advantages of the present invention are apparent from the following detailed description when read in conjunction with the accompanying drawings and appended claims.

BRIEF DESCRIPTION OF THE SEVERAL VIEWS OF THE DRAWING

FIG. 1 is a partially exploded perspective view of an open architecture computer having a modular computer peripheral constructed in accordance with the present invention disposed therein.

FIG. 2 is a partially cutaway perspective view of the modular computer peripheral of FIG. 1 illustrating a peripheral housing of the modular computer peripheral defining a plurality of module bays adapted to receive corresponding modules therein.

FIG. 3 is a perspective view of one of the modules depicted in FIG. 2.

FIG. 4 is a back view of one of the modules depicted in FIG. 2 illustrating a connector assembly disposed on the module.

FIG. 5 is an exploded perspective view illustrating a bus adapter which is disposed between one of the modules depicted in FIG. 2 and a bus connector disposed in a respective module bay of the modular computer peripheral.

FIG. 8 is a front elevational view of an open architecture computer having seven modular computer peripherals disposed therein and interconnected such that each of the modular computer peripherals can communicate with the open architecture computer, the remaining modular computer peripherals and combination thereof.

DETAILED DESCRIPTION OF THE INVENTION

Figure 6:
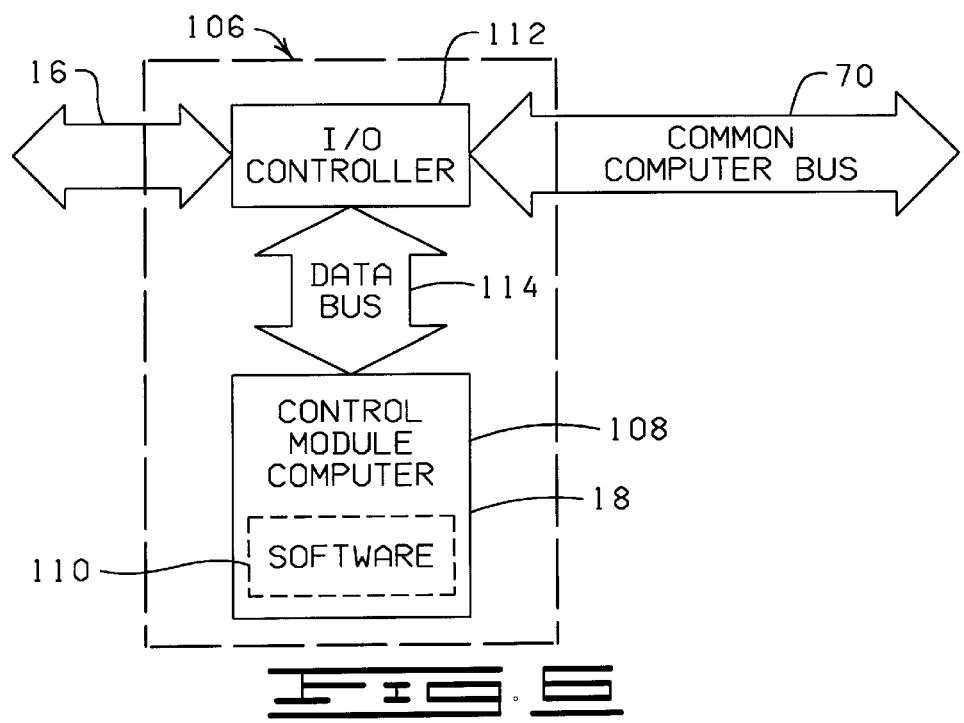
FIG. 6 is a schematic, diagrammatic view depicting a control module constructed in accordance with the present invention.

The term "closed architecture computer" as used herein refers to a computer in which the manner of operation (specifications) are not generally available to others so that they may design compatible accessories or software for the closed architecture computer. Examples of "closed architecture computers" are mainframe computer systems, proprietary computer systems, custom-designed or adapted computer systems, and combinations thereof.

The term "open architecture computer" as used herein refers to a computer in which the manner of operation (specifications) are generally available to others so that they may design compatible accessories or software for the open architecture computer.

Referring now to the drawings and more particularly to FIG. 1, shown therein and designated by the general reference numeral 10 is a modular computer peripheral which is electrically connected to a computer bus of a motherboard 12 of an open architecture computer 14 via a connector assembly 16 such as a connector cable. The computer bus has a plurality of bits in a well known manner. The connector assembly 16 can be any type of connector assembly which permits the modular computer peripheral 10 and the open architecture computer 14 to communicate. For example, the connector assembly 16 can be a conventional SCSI interface connector assembly. The modular computer peripheral 10 typically contains at least one closed architecture computer 18 (FIG. 6) interfaced with the open architecture computer 14 via the connector assembly 16. As will be described in more detail below, the open architecture computer 14 is provided with a terminate and stay resident computer program (not shown) stored in a predetermined portion of memory located in the open architecture computer 14. The terminate and stay resident computer program is adapted to intercept at least one software command directed at running at least a portion of an application program running on the open architecture computer 14 and to cause the application program to be at least partially executed in the modular computer peripheral 10.

The open architecture computer 14 is connected to an input unit 20 such as a keyboard so that a computer user can input data and other information into the open architecture computer 14 in a manner well known in the art. A display unit 22 such as a video monitor is connected to the open architecture computer 14 in a manner well known in the art. The open architecture computer 14 includes a housing 24 defining a housing space 26. The motherboard 12 of the open architecture computer 14 is disposed in a predetermined location within the housing space 26 of the housing 24. A power supply 28 is provided in a predetermined location within the housing space 26 of the housing 24. The power supply 28 supplies power to the motherboard 12 and the modular computer peripheral 10.

The modular computer peripheral 10 will now be described. The modular computer peripheral 10 is provided with a peripheral housing 40 defining a plurality of module bays 42. As shown in FIG. 2, there are 18 module bays 42 provided in the peripheral housing 40. The module bays 42 are illustrated via dashed lines and only three of the module bays are designated via the respective reference numerals 42a, 42b and 42c for purposes of clarity. It should be understood that the peripheral housing 40 of the modular computer peripheral 10 can be provided with any number of module bays 42. The peripheral housing 40 has a predetermined height 44, a predetermined width 46, and a predetermined length 48 such that the peripheral housing 40 is sized to be disposed in a predetermined peripheral space within the housing space 26 of the housing 24 of the open architecture computer 14 and mechanically connected to the housing 24 via screws, for example. In one embodiment, the peripheral housing 40 of the modular computer peripheral 10 has a predetermined height 44 of about 3.25", a predetermined width 46 of about 5.75", and a predetermined length 48 of about 8.5" so that the peripheral housing 40 is disposable within the predetermined peripheral space in the housing space 26 of the housing 24 of the open architecture computer 14 which is adapted to receive a hard drive, for example.

The modular computer peripheral 10 has a first end 50, a second end 52, a first side 54, a second side 56, a top end 58, and a bottom end 60. The modular computer peripheral 10 is further provided with a substantially planar and rigid back plate assembly 62 disposed in the peripheral housing 40 such that the back plate assembly 62 extends from the first side 54 of the peripheral housing 40 to the second side 56 thereof and about midway between the first end 50 and the second end 52 thereof so as to divide the module bays 42 defined by the peripheral housing 40 into a first group of module bays 64 and a second group of module bays 66. The first group of module bays 64 extend generally between the back plate assembly 62 to the first end 50 of the peripheral housing 40 and generally between the first side 54 and the second side 56 thereof. The second group of module bays 66 extend generally between the back plate assembly 62 and the second end 52 of the peripheral housing 40 and generally between the first side 54 and the second side 56 thereof. The back plate assembly 62 is provided with a back plate member 68 supporting a common computer bus 70 (FIG. 6) which is independent and separate from the computer bus provided on the motherboard 12 of the open architecture computer 14. The common computer bus 70 of the modular computer peripheral 10 is preferably at least twice as wide as the computer bus of the open architecture computer 14 and is typically 256 bits wide. The back plate member 68 has a first surface 72 facing the first group of module bays 64, and a second surface 74 facing the second group of module bays 66. The back plate assembly 62 is further provided with a plurality of bus connectors 76 (FIGS. 2 & 5) disposed on the first surface 72 and the second surface 74 (the bus connectors 76 are only shown on the first surface 72 because of the perspective view of FIGS. 2 & 5) of the back plate member 68 such that at least one bus connector 76 communicates with each module bay 42 provided in the modular computer peripheral 10.

Each of the bus connectors 76 is electrically connected to the common computer bus 70 of the modular computer peripheral 10 for a purpose to be described hereinafter and each bus connector 76 typically has 256 pins 78. In one embodiment, the first group of module bays 64 consists of nine contiguously disposed module bays 42 and the second group of module bays 66 consists of nine contiguously disposed module bays 42 so that the modular computer peripheral 10 has a total of 18 module bays.

Each of the module bays 42 is shaped and dimensioned to receive one module 90 therein. Only a few of the modules 90 have been specifically labeled in FIGS. 1 & 2 for purposes of clarity. The term "module" as used herein is to be understood to mean any type of module capable of providing data processing, storage abilities, and combinations thereof to a computer system. For example, the term "module" is intended to encompass mechanical hard drive modules, solid state hard drive modules, global position computer modules, modules containing a microprocessor or any other type of digital signal processing computer and combinations thereof.

One of the modules 90 is shown in more detail in FIG. 3. Each of the modules 90 is provided with a module housing 92 having a predetermined height 94, a predetermined width 96, and a predetermined length 98 sized to be matingly disposed in one of the module bays 42. In one embodiment, the predetermined height 94 is about 3.25", the predetermined width 96 is about 0.6", and the predetermined length 98 is about 4.0".

Shown in FIG. 4 is a rear view of one of the modules 90. Each module 90 is provided with a rear end 99 supporting a connector assembly 100 which is adapted to electrically connect the module 90 to the bus connector 76 disposed in the respective module bay 42 when the module 90 is disposed therein such that the module 90 can communicate with the common computer bus 70 of the modular computer peripheral 10. In one embodiment, the connector assembly 100 is provided with a plurality of openings 102 adapted to receive respective pins 78.

The mechanical hard drive module can be a model MK 1926FB obtainable from Toshiba. The solid state hard drive module can be a IMI-1000 obtainable from Information Machines International, Incorporated. The global position computer module can be an RG PS-11 available from Rockwell International Corporation.

As shown in FIG. 5, the connector assembly 100 of the mechanical and solid state hard drive modules can be provided with an IDE interface in a manner well known in the art. A bus adapter 104 can be connected between the IDE interface connector assembly 100 provided on the mechanical and solid state hard drive modules 90 and the 256 pin bus connector 76 provided in the respective module bay 42 to permit communication between the IDE interface connector assembly 100 and the bus connector 76.

One of the modules 90 disposed in a respective module bay 42 is a control module 106. The control module 106 is shown in diagrammatic form in FIG. 6. The control module 106 contains a control module computer 108 which is loaded with an operating system software 110 such that the control module computer 108 is programmed to control a predetermined number of other modules 90, and to run specialized programs such as virus detectors, decompression and compression algorithms, open architecture application programs, or any other type of desirable computer processing, and combinations thereof. The operating system software 110 loaded in the control module computer 108 can be different from the operating system software loaded on the open architecture computer 14. The control module computer 108 can be the closed architecture computer 18 so that the control module computer 108 does not have to conform to open architecture requirements. The control module computer 108 can be any appropriately programmed central processing unit or digital signal processing computer with associated memory. For example, the control module computer 108 can be a TI-C40 obtainable from Texas Instruments, Inc.

As shown in FIG. 6, the control module 106 is also provided with an IO controller 112. The IO controller 112 and the control module computer 108 communicate via a control computer module databus 114. The control computer module databus 114 can be any databus capable of permitting the IO controller 112 and the control module computer 108 to communicate as described herein. The control computer module databus 114 is typically about 64 bits wide. The IO controller 112 communicates directly with the common computer bus 70 of the modular computer peripheral 10, and directly with the connector assembly 16 electrically connecting the modular computer peripheral 10 with the motherboard 12 of the open architecture computer 14. The IO controller 112 controls the IO switching between the modular computer peripheral 10 and the open architecture computer 14 including any input or output data between the modular computer peripheral 10 and the open architecture computer 14. The IO controller 112 also controls any input or output data switching between two or more of the modules 90 including the input and/or output data switching between the control module 106 and any one or more of the other modules 90.

In one embodiment the common computer bus 70 is 256 bits wide. Each of the modules 90 is typically allocated 32 bits on the common computer bus 70 of which eight bits are common for the purposes of conveying information relating to the number of modules 90 and the type of modules 90. With the common computer bus 70 being 256 bits wide and each of the modules 90 being allocated 32 bits of which eight bits are common for the above mentioned purposes, ten modules 90 can operate at full speed in an independent fashion to perform selected data processing and/or storage tasks as required by the open architecture computer 14. In other words, each module 90 is allocated its own portion of the common computer bus 70 to communicate with the IO controller 112 and thus the control module computer 108, other modules 90, the open architecture computer 14 and combinations thereof so that each of the modules 90 can operate independently of the other modules 90 and the open architecture computer 14.

If more than ten modules 90 are desired in the peripheral housing 40, two or more of the modules 90 can be assigned to the same portion of the common computer bus 70 if the IO controller 112 is programmed to arbitrate between such modules 90 so as to eliminate any contention problems. The IO controller 112 can be programmed to perform the arbitration by any method known in the art such as by assigning predetermined priorities or queuing based on first come first served. For example, the IO controller 112 can be programmed to arbitrate between modules 90 in a manner similar to the way IRQ channels are arbitrated in the standard PC, or SCSI devices are arbitrated on a typical SCSI bus.

Information concerning the number of modules 90 disposed in the peripheral housing 40 can be determined by the control module computer 108 by sensing how many of the module bays 42 are occupied. The information concerning the type of module 90 can be determined by the control module computer 108 comparing a module type information stored on the module 90 with that in a table lookup stored in the control module computer 108. The module type information can be provided to the control module computer 108 by the respective modules 90 over the 8-bits of the common computer bus 70 reserved for this purpose as discussed above.

The IO controller 112 can be any IO controller capable of controlling the switching and/or input and output of data as previously described. In one embodiment, the IO controller 112 can be an appropriately programmed Texas Instruments TI-C40 or any other digital signal processing computer.

Figure 7:
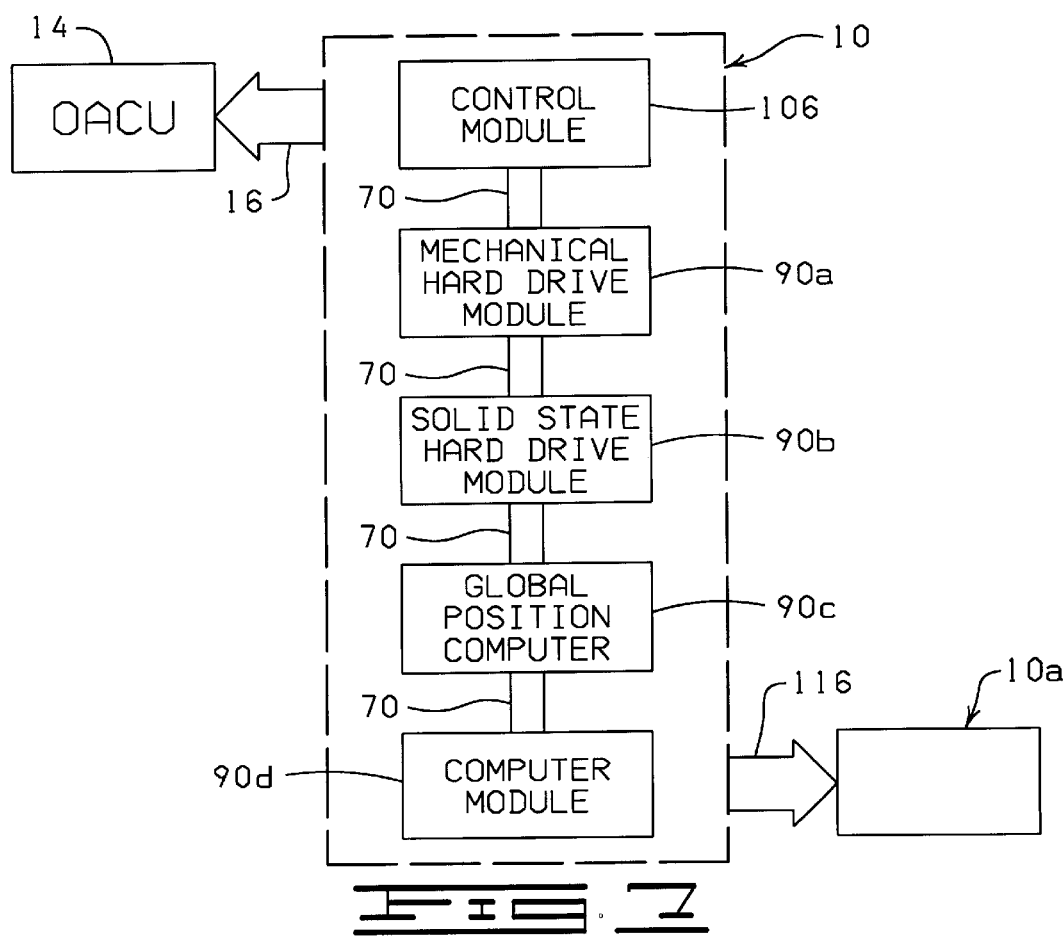
FIG. 7 is a diagrammatic, schematic view of the modular computer peripheral depicted in FIG. 1 wherein a control module, a mechanical hard drive module, a solid state hard drive module, a special purpose computer module, and a computer module are disposed in respective module bays in the peripheral housing depicted in FIG. 2.
Figure 9:
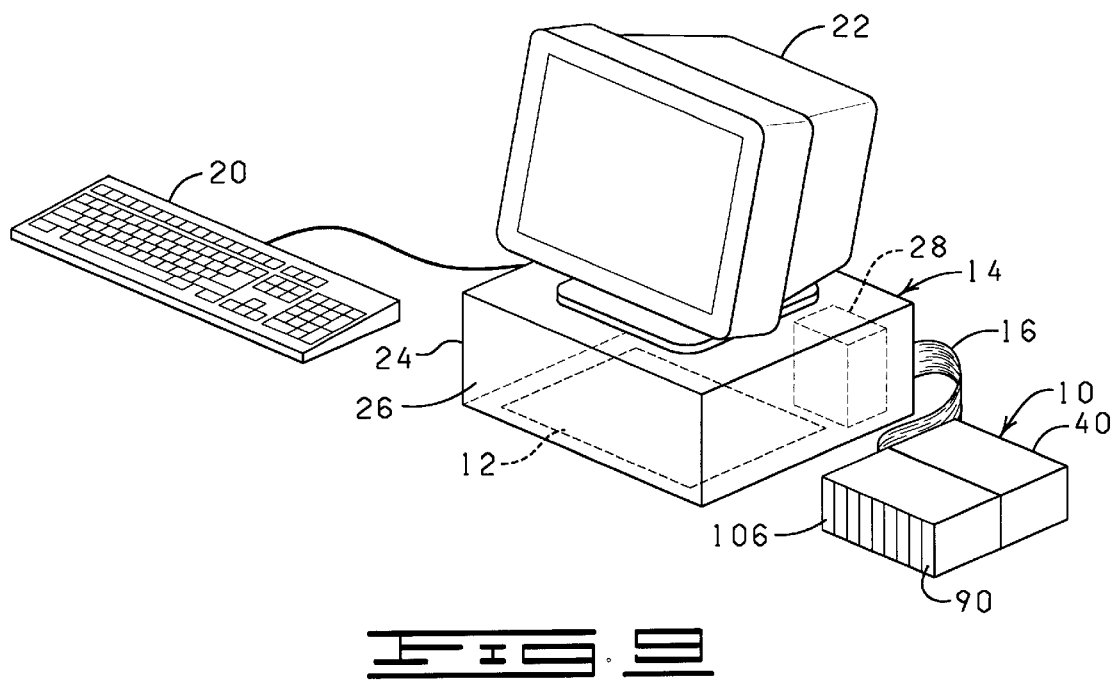
FIG. 9 is a perspective view illustrating the modular computer peripheral dispose externally of the housing.

Referring now to FIG. 7, shown therein in schematic, diagrammatic form is an example of one embodiment of the modular computer peripheral 10 which is constructed in accordance with the present invention. The modular computer peripheral 10 is provided with a control module 106, a mechanical hard drive module 90a, a solid state hard drive module 90b, a special purpose computer module 90c (eg. a global position computer) and a computer module 90d all connected to communicate via the common computer bus 70. The modular computer peripheral 10 is connected to the open architecture computer 14 via the connector assembly 16 being a SCSI connection. SCSI connections are well known to those skilled in the art. Thus, no more comments regarding the making and use of SCSI connections are deemed necessary. In this example, the open architecture computer 14 is an existing vehicle mounted computer system which operates using a UNIX based operating system which is well known to those skilled in the art. The control module computer 108 of the control module 106 is programmed to store and retrieve data from the mechanical hard drive module 90a when the vehicle is stopped, and the solid state hard drive module 90b when the vehicle is in motion. An algorithm can be provided in the control module computer 108 to copy all relevant information from the mechanical hard drive module 90a to the solid state hard drive module 90b via the common computer bus 70 when the vehicle is placed in gear, for example. In addition, the special purpose computer module such as the global position computer module 90c can provide vehicle location information to both the vehicle operator and other computers via a radio interface module (not shown). The computer module 90d is provided with a digital signal processing computer or a microprocessor such as a Pentium.

The control module computer 108 provided in the control module 106 is programmed to transmit and store a terminate and stay resident program in the memory of the open architecture computer 14 upon initialization of the control module computer 108. The terminate and stay resident program can be permanently stored in the control module computer 108 via read only memory so that the terminate and stay resident program is available to the control module computer 108 upon initialization. The terminate and stay resident program is adapted to intercept at least one software command directed at running at least a portion of an application program running on the open architecture computer 14 and to transmit portions of the application program to the modular computer peripheral 10 to cause the application program to be at least partially completed in the control module computer 108, the computer module 90d, and combinations thereof. In response to intercepting the software command, the terminate and stay resident program forwards the software command to the control module computer via the SCSI connection the IO controller 112 and the control computer module databus 114. The control module computer 108 receives the software command and in response thereto, either executes the software command and transfers the data results back to the open architecture computer 14 or transfers the software command to one of the computer modules 90d for execution. Once the computer module 90d receives the software command, the computer module 90d executes same and then transfers the data results back to the open architecture computer 14 as hereinbefore described. If the software command is a request for data stored on the modular computer peripheral 10, the control module computer 108 forwards the software command to the appropriate storage module or modules 90 so that the requested data can be transferred to the open architecture computer 14. If the software command received by the control module 106 is a request for at least a portion of the application program to be executed by the modular computer peripheral 10 and that portion of the application program or data is stored in one or more of the mechanical and/or solid state hard drive modules 90a and 90b (storage modules); the control module computer 108 either transmits a request to the IO controller 112 to have such portion of the application program or data transferred from the storage modules 90a and 90b to the control module computer 108 via the common computer bus 70, the IO controller 112 and the control computer module databus 114 so that the control module computer 108 can execute the software command and forward the results back to the open architecture computer 14 via the control computer module databus 114, the IO controller 112 and the connector assembly 16, or the control module computer 108 sends the software command to one of the computer modules 90d via the control computer module databus 114, the IO controller 112 and the common computer bus 70. Upon receipt of the software command, the computer module 90d communicates with the storage modules to receive the appropriate data to execute the software command. Once the software command is executed, the results or data are typically transferred back to the open architecture computer 14 via the common computer bus 70, the IO controller 112 and the connector assembly 16.

It should be noted that more than one computer module 90d can be disposed in the peripheral housing 40 of the modular computer peripheral 10. The control module computer 108 is programmed to operate the computer modules 90d in a parallel fashion to provide more computing power to the open architecture computer 14.

The modular computer peripheral 10 can be provided with a second connector assembly 116 to permit the modular computer peripheral 10 to be electrically connected to a second modular computer peripheral 10a. The second connector assembly 116 can be a SCSI connection, for example. The modular computer peripheral 10 and 10a are substantially identical in construction and function. Thus, no more comments are deemed necessary to teach one of ordinary skill in the art to make and use the modular computer peripheral 10a.

Referring now to FIG. 8, shown therein and designated by the general reference numerals 10, 10a, 10b, 10c, 10d, 10e and 10f are seven modular computer peripherals which are constructed in accordance with the present invention and disposed within the housing 24 of the open architecture computer 14. The modular computer peripherals 10, 10a, 10b, 10c, 10d, 10e and 10f are identical in construction and function as the modular computer peripheral 10 hereinbefore described with reference to FIGS. 1–7. The modular computer peripherals 10, 10a, 10b, 10c, 10d, 10e and 10f are connected to the power supply 28 via respective power cables 118, 118a, 118b, 118c, 118d, 118e and 118f to supply power thereto. The modular computer peripheral 10 is connected to the motherboard 12 via the connector assembly 16, and to the modular computer peripheral 10a via the second connector assembly 116 as previously described with reference to FIG. 7. The modular computer peripheral 10a is electrically connected to the modular computer peripheral 10b via a third connector assembly 119. The modular computer peripheral 10b is electrically connected to the modular computer peripheral 10c via a fourth connector assembly 120. The modular computer peripheral 10c is electrically connected to the modular computer peripheral 10d via a fifth connector assembly 122. A modular computer peripheral 10d is electrically connected to the modular computer peripheral 10e via a sixth connector assembly 124. The modular computer 10e is electrically connected to the modular computer peripheral 10f via a seventh connector assembly 126.

The connector assembly 16, second connector assembly 116, third connector assembly 119, fourth connector assembly 120, fifth connector assembly 122, sixth connector assembly 124 and seventh connector assembly 126 can be SCSI connections to permit up to seven modular computer peripherals to be daisy chained and/or interconnected to a single open architecture computer. The open architecture computer can be a NCR module 3450.

Although the modular computer peripherals 10, 10a, 10b, 10c, 10d, 10e and 10f have been shown and described herein as being disposed internally in the housing 24 of the open architecture computer 14, it should be understood that the modular computer peripherals 10, 10a, 10b, 10c, 10d, 10e and 10f can be disposed externally of the housing 24 of the open architecture computer 14 and mechanically connected to the housing 24 via a cable, for example. In the externally disposed embodiment (not shown), the modular computer peripherals 10, 10a, 10b, 10c, 10d, 10e and 10f can have power supplies which are separate from the power supply 28 provided with the open architecture computer 14.

Figure 10:
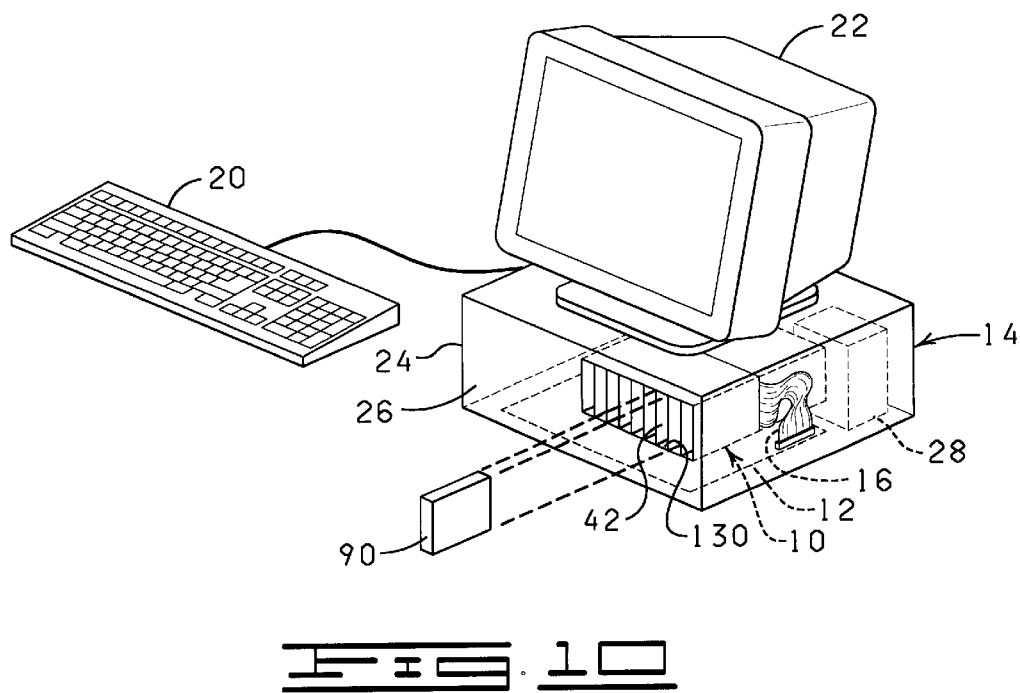
FIG. 10 is a perspective view illustrating an opening formed through the housing of the open architecture computer.

Referring now to FIG. 10, it should be noted that in one embodiment, the housing 24 of the open architecture computer 24 has an opening 130 formed therethrough such that the modules 90 can be disposed through the opening 130 in the housing 24 of the open architecture computer 24 and into the module bays 42 of the modular computer peripheral 10.

Changes may be made in the embodiments of the invention described herein, or in the parts or the elements of the embodiments described herein, or in the steps or sequence of steps of the methods described herein, without departing from the spirit and/or the scope of the invention as defined in the following claims.

What is claimed is:

1. An apparatus for converting an only one open architecture computer into both an open and a closed architecture computer, the converted open architecture computer including a housing defining a housing space and a computer processor disposed in the housing space of the housing, the apparatus comprising:

a modular computer peripheral capable of communicating with the converted open architecture computer, the modular computer peripheral comprising:
a housing defining a plurality of module bays;
at least one module, each of the modules being disposable in one of the module bays and at least one of the modules comprising a closed architecture computer which is capable of operating independently of the converted open architecture computer, and executing at least a portion of an application program responsive to receiving a request for at least the portion of the application program to be executed by the modular computer peripheral;
a controller communicating with at least one of the modules and capable of simultaneously controlling a plurality of the modules; and
interface means connected to the controller and at least one of the modules when the modules are disposed in the module bays of the housing for permitting communication between the controller and the modules; and
communication means capable of communicating with the converted open architecture computer and the modular computer peripheral for establishing communication between the computer processor of the open architecture computer and the controller of the modular computer peripheral.

2. An apparatus as defined in claim 1, wherein the housing of the converted open architecture computer defines a hard drive space which is shaped and dimensioned to receive a pre-existing hard drive, and wherein the housing of the modular computer peripheral is disposed in the hard drive space of the converted open architecture computer.

3. An apparatus as defined in claim 2, wherein the housing of the converted open architecture computer has an opening formed therethrough such that the modules can be disposed through the housing of the converted open architecture computer and into one of the module bays of the modular computer peripheral.

4. An apparatus as defined in claim 1, wherein the controller comprises means for automatically determining the type and number of modules which are connected to the interface means.

5. An apparatus as defined in claim 4, wherein the controller further comprises means for arbitrating the modules which are simultaneously utilizing the interface means so as to eliminate contention problems.

6. An apparatus as defined in claim 1, wherein the communication means includes a SCSI interface connecting the converted open architecture computer to the closed architecture computer and wherein the SCSI interface is at least 16 bits wide.

7. An apparatus as defined in claim 1, wherein the computer processor of the converted open architecture computer is programmed to have a terminate and stay resident computer program stored therein wherein the terminate and stay resident computer program intercepts at least one operating command which is directed at running at least one open architecture computer application program and the terminate and stay resident computer program causes the open architecture computer application program to be at least partially completed in one of the closed architecture computer modules of the modular computer peripheral.

8. An apparatus as defined in claim 1, wherein the modular computer peripheral is disposed externally of the housing of the converted open architecture computer.

9. An apparatus as defined in claim 1, wherein the converted open architecture computer includes a computer bus having a plurality of bits with the computer bus communicating with the computer processor, and wherein the interface means of the modular computer peripheral includes a common computer bus having at least twice as many bits as the computer bus of the converted open architecture computer.

10. An apparatus as defined in claim 9 wherein more than one module can simultaneously communicate with the controller via the common peripheral bus.

11. An apparatus as defined in claim 1, wherein the housing of the modular computer peripheral defines at least six module bays.

12. An apparatus as defined in claim 1, wherein the interface means includes a back plate assembly extending generally through the modular computer peripheral housing such that each of the module bays communicates with the back plate assembly, the back plate assembly supporting a plurality of bus connectors such that at least one bus connector communicates with each module bay provided in the modular computer peripheral.

13. An apparatus as defined in claim 12 wherein the modular computer peripheral housing includes a first end, a second end, a first side and a second side, and wherein the back plate assembly extends from the first side of the modular computer peripheral housing to the second side thereof and about midway between the first end and the second end thereof so as to divide the module bays defined by the modular computer peripheral housing into a first group of module bays and a second group of module bays.

14. An apparatus as defined in claim 13 wherein the first group of module bays extends generally between the back plate assembly to the first end of the modular computer peripheral housing and generally between the first side and the second side thereof, and the second group of module bays extends generally between the back plate assembly and the second end of the modular computer peripheral housing and generally between the first side and the second side thereof.

15. An apparatus for converting an only one open architecture computer into both an open and a closed architecture computer, the converted open architecture computer including a housing defining a housing space and a computer processor disposed in the housing space of the housing, the apparatus comprising:

a modular computer peripheral capable of communicating with the converted open architecture computer, the modular computer peripheral comprising:
a housing defining a plurality of module bays;
at least two modules, each of the modules being disposed in one of the module bays and the two modules being different types of modules;
a controller communicating with the two modules and capable of simultaneously controlling the two modules; and
interface means connected to the controller and the modules when the modules are disposed in the module bays of the housing for permitting communication between the controller and the modules; and
communication means capable of communicating with the converted open architecture computer and the modular computer peripheral for establishing communication between the computer processor of the open architecture computer and the controller of the modular computer peripheral.

16. An apparatus for converting an only one open architecture computer into both an open and a closed architecture computer, the converted open architecture computer including a housing defining a housing space and a computer processor disposed in the housing space of the housing, the apparatus comprising:

a modular computer peripheral capable of communicating with the converted open architecture computer, the modular computer peripheral comprising:
a housing defining a plurality of module bays;
at least two modules, each of the modules being disposed in one of the module bays and the two modules being different types of modules, at least one of the modules being a closed architecture computer for executing at least a portion of an application program responsive to receiving a request for at least a portion of the application program to be executed;
a controller communicating with the two modules and capable of simultaneously controlling the two modules; and
interface means connected to the controller and the modules when the modules are disposed in the module bays of the housing for permitting communication between the controller and the modules; and
communication means capable of communicating with the converted open architecture computer and the modular computer peripheral for establishing communication between the computer processor of the open architecture computer and the controller of the modular computer peripheral.

* * * * *